US006948068B2

(12) United States Patent
Lawandy et al.

(10) Patent No.: US 6,948,068 B2
(45) Date of Patent: Sep. 20, 2005

(54) METHOD AND APPARATUS FOR READING DIGITAL WATERMARKS WITH A HAND-HELD READER DEVICE

(75) Inventors: Nabil M. Lawandy, North Kingstown, RI (US); John A. Moon, Wallingford, CT (US)

(73) Assignee: Spectra Systems Corporation, Providence, RI (US)

( * ) Notice: Subject to any disclaimer, the term of this patent is extended or adjusted under 35 U.S.C. 154(b) by 461 days.

(21) Appl. No.: 09/929,399

(22) Filed: Aug. 14, 2001

(65) Prior Publication Data

US 2002/0023218 A1 Feb. 21, 2002

Related U.S. Application Data

(60) Provisional application No. 60/225,429, filed on Aug. 15, 2000.

(51) Int. Cl.[7] .......................... H04M 1/00; B65D 85/00
(52) U.S. Cl. ....................... 713/176; 713/176; 709/204; 382/100; 235/380; 235/462.01
(58) Field of Search .................... 709/204; 382/100; 235/380, 462.01

(56) References Cited

U.S. PATENT DOCUMENTS

| | | | | |
|---|---|---|---|---|
| 5,592,561 | A | | 1/1997 | Moore ......................... 382/103 |
| 5,974,150 | A | | 10/1999 | Kaish et al. ................... 380/25 |
| 6,085,903 | A | * | 7/2000 | Jotcham et al. ........... 206/459.5 |
| 6,192,138 | B1 | | 2/2001 | Yamadaji ..................... 382/100 |
| 6,282,650 | B1 | | 8/2001 | Davis .......................... 713/176 |
| 6,311,214 | B1 | * | 10/2001 | Rhoads ........................ 709/217 |
| 6,345,104 | B1 | | 2/2002 | Rhoads ........................ 382/100 |
| 2001/0023193 | A1 | * | 9/2001 | Rhoads ........................ 455/566 |
| 2004/0022444 | A1 | * | 2/2004 | Rhoads ........................ 382/232 |

OTHER PUBLICATIONS

Maur Barni, Franco Bartolini, Vito Cappellini, Alessandro Piva, Copyright protection of digital images by embedded unperceivable marks, Dipartmento di Ingegneria Elettronica, Universita di Firenze, Firenze, Italy, Elsevier Preprint, Feb. 1998.*

* cited by examiner

Primary Examiner—Ayaz Sheikh
Assistant Examiner—Taghi T. Arani
(74) Attorney, Agent, or Firm—Harrington & Smith, LLP

(57) ABSTRACT

A method and apparatus is disclosed for use with an object bearing a digitally watermarked image. The method includes operating a device, such as a hand-held device, to generate digital data representing the digitally watermarked image and to process the digital data to extract information encoded within the digitally watermarked image. The method further includes transmitting the extracted information through at least one of a wired or a wireless communication link towards a data processor located external to the hand-held device; receiving the extracted information at the data processor and operating the data processor to take some action based on the received information. The data processor receives the extracted information through a data communications network which may include or be coupled to the Internet. The extracted information may be expressive of a data communications network address, such as a WWW address, through which the data processor can be reached. The action taken by the data processor can include using the extracted information to access a database, and/or using the extracted information to verify an identity of the object, and/or using the extracted information to verify an identity of a person who is associated with the object, and/or using the extracted information to obtain information that is associated with a person who is associated with the object, and/or using the extracted information to verify an authenticity of the object. The action can also include transmitting information from the data processor for reception by the hand-held device, and for possible display by the hand-held device. One or more taggants can be used in the substrate that bears the digitally watermarked image for encoding additional information.

27 Claims, 4 Drawing Sheets

METHOD AND APPARATUS FOR READING DIGITAL WATERMARKS WITH A HAND-HELD READER DEVICE

CLAIM OF PRIORITY

This application claims priority under 35 §U.S.C. 119(e) from U.S. Provisional Application Ser. No. 60/225,429, filed Aug. 15, 2000, by Nabil M. Lawandy and John A. Moon. The disclosure of this Provisional Patent Application is incorporated by reference herein in its entirety.

FIELD OF THE INVENTION

These teachings relate to methods and apparatus for reading digital watermarks using a hand-held reader device, as well as to using information encoded into the digital watermark to access a data communications network, such as a world wide web (WWW) server.

BACKGROUND OF THE INVENTION

A known security device for verifying an item's authenticity is a watermark. Watermarks or signatures are typically produced by utilizing semantic information of the item to be protected, for example, alphanumeric characters, physical features, etc. or other related information (e.g. ownership information). These signatures or watermarks are typically kept with, or incorporated into the protected item. For example, a watermark may be printed within the substrate of a negotiable instrument which includes information regarding the value and the originator of the instrument.

Various digital watermarking techniques are known for both still and video images. For example, reference in this regard may be had to Hartung et al., "Digital Watermarking of Raw and Compressed Video", Systems for Video Communication, October 1996, pp. 205–213 and Hartung et al., "Watermarking of MPEG-2 Encoded Video Without Decoding and Re-encoding", Proceedings of SPIE 3020, Multimedia Computing and Networking 97 (MMCN 97), February 1997.

Some of the techniques discussed in these papers include separately coding the image and a watermark image using a pseudorandom number generator and a discrete cosine transform (DCT) to form coded blocks, one of the image to be watermarked and the other of the watermark itself. The DCT coefficients representing the coded watermark block and the coded image block are then added together to form a combined block thus digitally watermarking the image.

Reference may also be had to U.S. Pat. No. 6,037,984, entitled "Method and Apparatus for Embedding a Watermark into a Digital Image or Image Sequence," by Isnardi et al., issued Mar. 14, 2000. This patent discloses watermarking an image or sequence of images using a DCT unit and quanitizer. The patent discloses generating an array of quantized DCT coefficients and watermarking the array by selecting certain ones of the DCT coefficients and replacing them with zero values. The masked array is further processed by a watermark inserter that replaces the zero valued coefficients with predefined watermark coefficients to form a watermarked array of DCT coefficients, that is, a watermarked image.

Reference can also be had to U.S. Pat. No. 5,841,978, entitled "Network Linking Method Using Steganographically Embedded Data Objects" by Rhoads, issued Nov. 24, 1998. This patent describes a data object containing both a graphical representation to a network user and embedded information, such as the URL address of another network node, to enable the object itself to serve as an automated hot link.

An example of a commercially available digital watermarking system can be obtained from Digimarc Corporation (www.digimarc.com), which is shipped with Adobe Photoshop(tm).

By way of summary, digital watermarking involves taking a digital representation of some information and altering it such that a final sensing device, whether electronic or human, will not notice the alteration without using some specific type of decoding device. The decoding device may be implemented as a combination of hardware and software.

SUMMARY OF THE INVENTION

These teachings are directed to a hand-held, portable apparatus for reading and decoding a digital watermark embedded in, for example, a printed document and in other suitable types of objects having a capability of having a digital watermark applied thereto. The hand-held device obtains a high resolution image, preprocesses the image into a form Suitable for reading a digital watermark, reads or decodes the digital watermark information and, optionally, uses the decoded information for taking or initiating some action. The action may be, for example, accessing a location on the Internet through a wired or wireless link.

Exemplary of these teachings is a method for use with an object bearing a digitally watermarked image, as well as apparatus for implementing the method. The method includes operating a device, preferably but not necessarily a hand-held device, to generate digital data representing the digitally watermarked image and to process the digital data to extract information encoded within the digitally watermarked image. The method further includes transmitting the extracted information through at least one of a wired or a wireless communication link towards a data processor located external to the hand-held device; receiving the extracted information at the data processor and operating the data processor to take some action based on the received information. In the preferred embodiment the data processor receives the extracted information through a data communications network which may include or be coupled to the Internet. The extracted information may be expressive of a data communications network address, such as a WWW address, through which the data processor can be reached.

The action taken by the data processor can include, as examples, using the extracted information to access a database, and/or using the extracted information to verify an identity of the object, and/or using the extracted information to verify an identity of a person who is associated with the object, and/or using the extracted information to obtain information that is associated with a person who is associated with the object, and/or using the extracted information to verify an authenticity of the object.

The action can also include transmitting information from the data processor for reception by the hand-held device, and for possible display by the hand-held device.

A substrate that bears the digitally watermarked image may contain one or more physical security features or taggants placed on or in the substrate, such as a UV fluorescent color ink, threads, fibers, planchettes and/or particles. The detected presence or absence of the security features, in conjunction with the digitally watermarked image, may be used as information in the watermarked image and/or as a key to unlock the coded information in the digitally watermarked image. In this regard the hand-held reader may determine from, by example, one or more of the size, density per unit area, shape, color and/or UV emission wavelengths a code or other information that is used in conjunction with the digitally watermarked image.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE PREFERRED EMBODIMENTS

Figure 1:
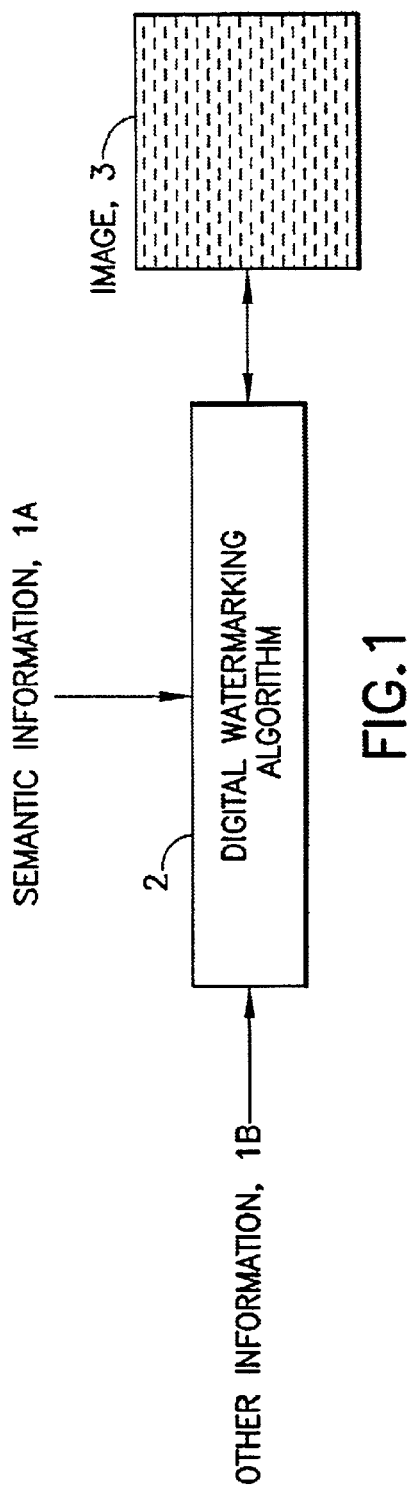
FIG. 1 is a logic depiction of the operation of a digital watermarking algorithm.

FIG. 1 depicts semantic information 1A and optional other information 1B that are provided as inputs to a digital watermarking algorithm 2 which in turn generates a digital watermark that is incorporated into an image 3. It should be understood that the other information 1B could also be used as key, where the digital watermarking algorithm 2 uses the key to decode or otherwise retrieve information encoded in the digital watermark found in the image 3. The digital watermark may be embodied as part of a protected item, for example, it may be printed on the object, or it may be included as part of a substrate of the object. The object may be a document, currency, a negotiable security, or any desired type of item or object.

Figure 2:
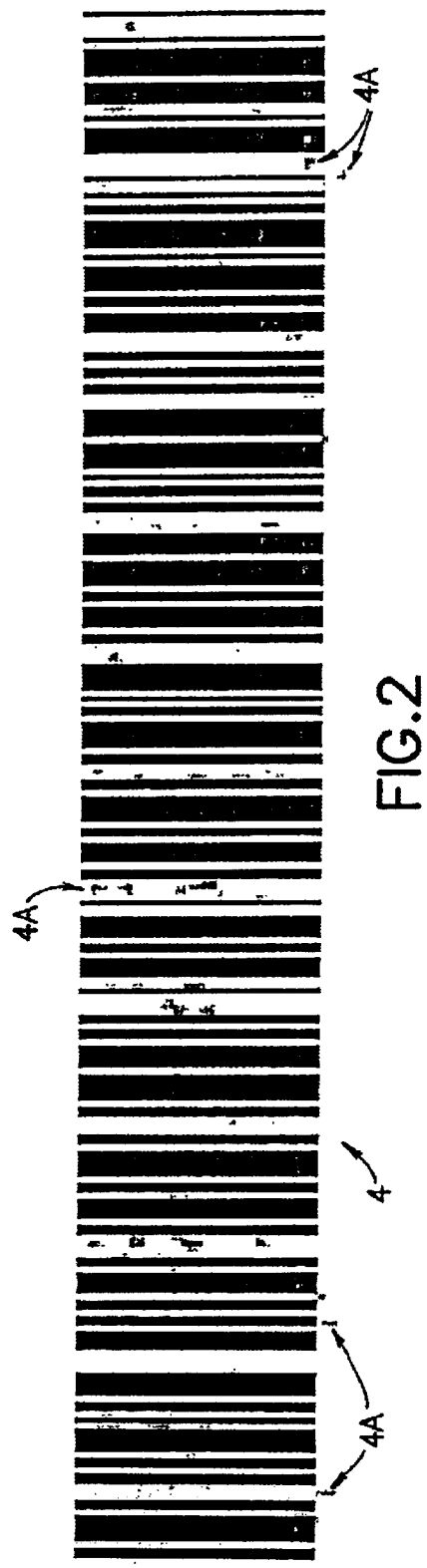
FIG. 2 shows an example of a digitally watermarked bar code.

In an embodiment of these teachings bar code symbology is employed with the digital watermark, as shown in FIG. 2, such that the image 3 is an image of a digitally watermarked bar code 4. The bar code 4 may be implemented using any suitable symbology including, without limitation, 3 of 9, I2 of 5, Code 128, UPC, 2-D, and 3-D techniques. The digital watermark may be incorporated as a digitally embedded imprint in the bit pattern or noise of a digital image of the bar code 4, shown generally in FIG. 2 as the regions 4A. Known software technologies can be used to embed the digital watermark such that it is recoverable using software, or other automated or manual techniques. The digital watermark may also include additional information which may be decoded by utilizing a key to "unlock" data included in the watermark. The digital watermark, and the other information which may be embedded in the digital watermark, is robust to image deformations, rotations, copying, multiple renderings, conversions, and other manipulations.

Furthermore, the bar code 4 encrypted with digitally watermarked information can be made to contain a pass key to allow reading of the bar code itself For example, if the digital watermark is not read, then a properly designed terminal will not read the bar code 4. This aspect is discussed in further detail below in relation to the use of taggants in or on the substrate 50.

In general, a method for watermarking the bar code 4 may include regarding the bar code as an image and watermarking the bar code using a technique suitable for watermarking images. For example, the bar code 4 could be treated as a pixelated two dimensional image and modified using the digital watermark. As such, the watermark may be incorporated as a digitally embedded imprint in the bit pattern or noise of a digital image of the bar code 4.

The digital watermark may include additional information. This information may be related to an object which may be associated with the bar code 4. This information may include the date of manufacture, the country of origin, the authorized distribution channel, or any other information that may be informative or useful. This is advantageous in that the bar code 4 may function as a conventional barcode, and may also carry additional information that may not be discernable without knowledge of the watermark and the ability to read the information included therein. This indiscernible information may be useful for various applications, for instance, the anti-diversion of branded products. As an example, the additional information could be incorporated into the UPC bar code of an item.

Any of a number of different types of digital watermarking methodologies may be used for placing the digitally watermarked image 3 on an object of interest, including those referred to previously.

Figure 3:
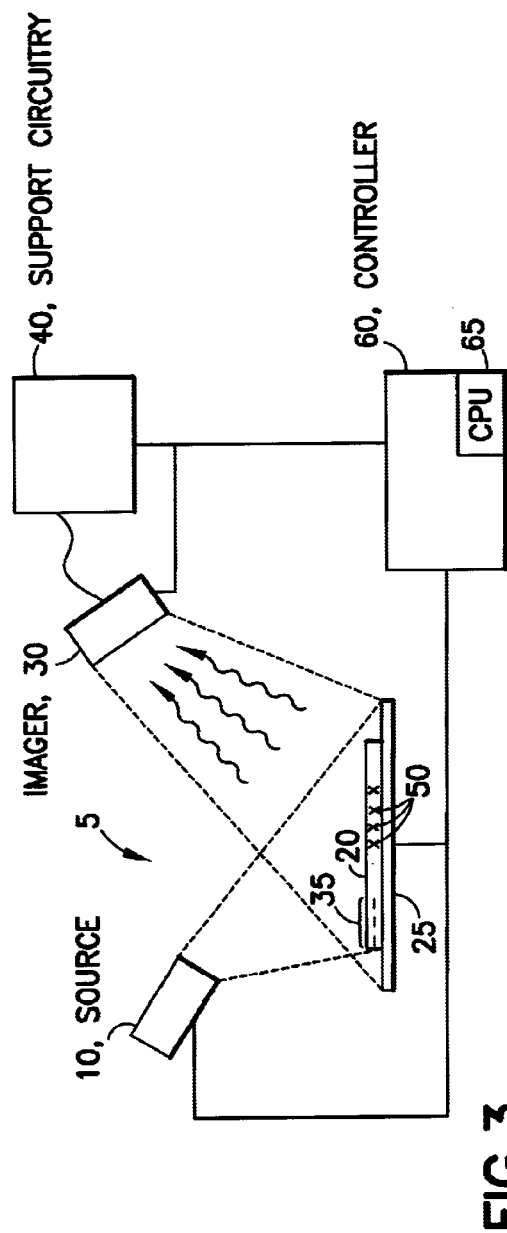
FIG. 3 is a block diagram of a hand-held digitally watermarked image reader system in accordance with these teachings.

A hand-held digital watermark reader system 5 in accordance with these teachings is shown in FIG. 3. A pulsed or continuous source of illumination 10 is directed on an item 20 to be examined. The item 20 could be a document, a device, a package, or any type of object having some type of substrate 50 upon which the digitally watermarked image 3 can be imprinted or otherwise applied. The source 10 preferably generates UV radiation, but may generate any type of electromagnetic radiation that is suitable for detecting the digital watermark 35, such as the bar code 4 of FIG. 2. However, in some embodiments the source of illumination 10 may not be necessary if sufficient ambient lighting exists to generate an image of the digital watermark 35.

The item 20 may be mounted on a positioning device 25. The positioning device 25 may include a conveyor or any other type of device suitable for transporting or locating the item 20 for being read by the reader 5.

A detector array 30, such as a CCD camera, with appropriate support circuitry 40 detects an image of the digital watermark 35 on the item 20. In response to illumination by the source 10 the detector array 30 generates digital data that represents an image of the digital watermark 35 on the item 20, and this image data is then processed by a digital watermarking recovery or decoding algorithm that is compatible with the digital watermarking algorithm of FIG. 1 to recover the information encoded into the digital watermark 35, such as the digitally watermarked bar code 4 of FIG. 2. Control circuitry 60, such as suitably programmed microprocessor (CPU) 65, directs the overall activity of the hand-held reader system 5, and preferably also executes the program instructions required to implement the readout and decoding portion of the digital watermarking algorithm 2.

Figure 5:
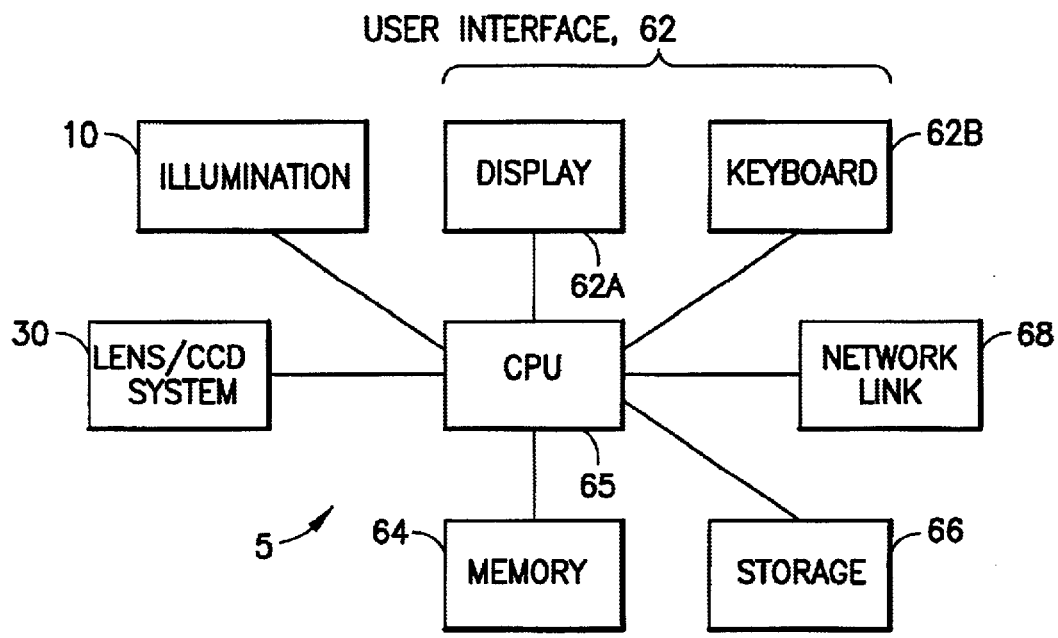
FIG. 5 is a further block diagram showing the major sub-components of the hand-held digitally watermarked image reader device.

FIG. 5 is a further block diagram showing the major sub-components of the hand-held digital watermark reader device 5. In addition to the previously described components the reader 5 may include a suitable user interface 62, including a display 62A, such as an LCD display, and a data entry device 62B, such as a keypad or a keyboard. The reader 5 also preferably includes a program memory 64 and a data storage memory or device 66. The data storage memory or device 66 may be fixed, e.g., semiconductor memory, or removable, e.g., a diskette or a tape, and can be used to store the image data representing the digitally watermarked images 35, or the information that is extracted from the digitally watermarked images during the operation of the digital watermark decoding algorithm 2 of the reader 5.

In the presently preferred embodiment the reader 5 also includes a wired or a wireless data communication network interface or link adapter 68, described in further detail below.

Figure 4:
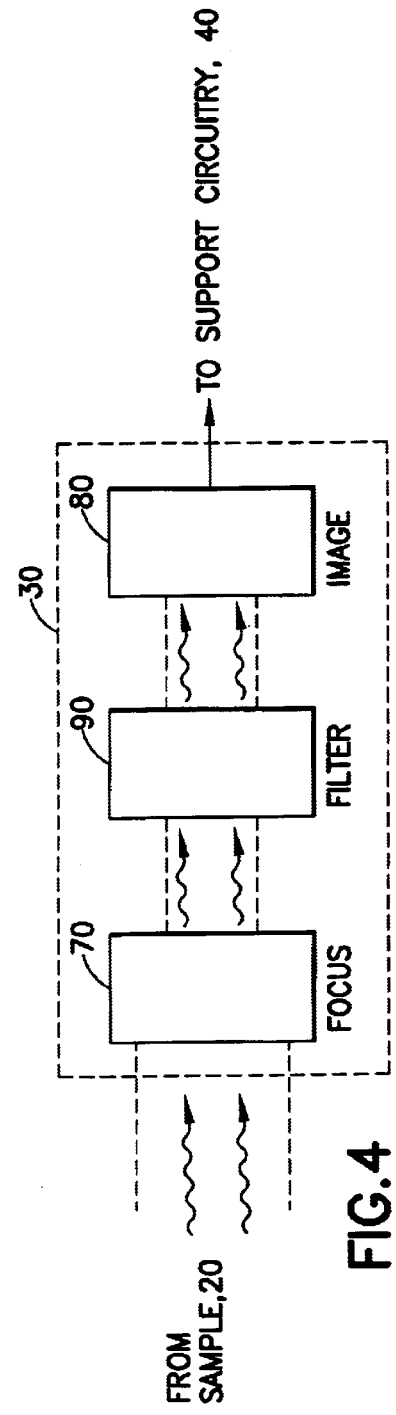
FIG. 4 is a block diagram of a detector array that is part of the reader system of FIG. 3.

FIG. 4 is a block diagram of the imager 30, or detector array, that is part of the hand-held reader system 5 of FIG. 3. The detector array 30 includes an optical section 70 for focusing received light within the detector array 30, an array of light-responsive sensors 80 for detecting the received light, and an optional filter section 90 for allowing only one or more wavelengths of interest to impinge on the sensors 80. For example, the filter section 90 may block the light from the source 10 and/or filter out ambient illumination such as sunlight or light from fluorescent bulbs. The sensor array 80 may be constructed with any type of sensors suitable for detecting the light reflecting from or emitted by the sample object 20, for example, a photodiode array or a CCD array, and is assumed to contain a sufficient number of light sensitive elements or pixels for obtaining the required image resolution for resolving the features of the digital watermark. The output data from the detector array 30 is analyzed to detect the characteristics of the digital watermark 35. One suitable hand-held imager is known as Pocketeye(tm), which is available from Spectra Systems Corporation of Providence R.I., and which is modified in accordance with these teachings to provide the capability to read and decode the digital watermark 35.

It should be appreciated that these teachings are not limited for use with a digitally watermarked bar code 4 of the type depicted in FIG. 2, but could be used as well with a variety of different types of images, including processed photographic images of persons or places, various types of artwork, as well as random or pseudorandom patterns of lines, dots and/or other shapes.

As one example, the digitally watermarked image could be an image of a person obtained with a digital camera, and then processed to be digitally watermarked with information related to the person, such as name, address, date of birth, social security number and the like. In this case the processed photograph could be imprinted onto a credit card, a bank debit card, a driver's license or some other type of identification card or paper, and the hand-held reader 5 may then be employed by sales, banking or law enforcement or other personnel to verify, for example, the person's identity, or date of birth, or driver's license number.

To summarize thus far, digital watermarking is a technique to embed (ideally) invisible information into a document or other type of object. The digital watermark information is contained within a variation in image information. In the case of black-and-white images, such as bar codes, the watermark information can be contained within a slight modulation in the width of the bars, or modulation in grey scale of the pixels comprising the bars and/or spaces, but not so much that the value of the bar code is changed or is not easily read by a conventional bar code scanner or reader. Thus, the digital watermark reader preferably has a resolution that is greater than the spatial resolution of the bar code reader or scanner itself.

The controller 60 executes software that is suitable for preprocessing the image into a form that is suitable for reading the digital watermark. In that the reader 5 is preferably a hand-held device, it may digitize the image at a viewing angle other than normal to the substrate 50, which may introduce distortion, such as foreshortening. As such, once the image is digitized it is preferred that CPU of the controller 60 locate the borders of the image and then subsequently remove the image distortion. Various types known image processing algorithms can be employed to remove or compensate for the image distortion resulting from viewing the digital watermark image from a non-normal viewpoint.

After this image preprocessing step the CPU 65 of the controller 60 executes a suitable algorithm for extracting the information encoded within the digital watermark. The algorithm maybe conventional in nature, and may be based on one of those discussed above, and need not be specially modified to operate in conjunction with the hand-held reader 5.

Having extracted the encoded information, the information is then used in some way. In one example, and referring to FIG. 5, the information may be displayed to the user in some suitable manner, such as by using the integral display device 62A of the hand-held reader 5. In the preferred embodiment the hand-held reader 5 includes the wired (e.g., a tethered) data communication network link adapter 68, or a wireless (e.g., RF or IR) data communication network link adapter 68. In this case the information extracted from the digital watermark may be sent to a local or a remote computer for storage and/or display. The specifics of the wired or wireless link are not germane to an understanding of this invention, and bit serial or bit parallel, synchronous or asynchronous links could be employed. The wired link may include one or both of electrical wires and fiber optic conductors.

The use of the extracted digital watermark information could also be more complex, such as when the digital watermark contains a WWW address. In this case the WWW address may be displayed on a graphical browser that resides in the reader device 5, and upon a user command entered with keypad 62B the WWW address may be accessed through the Internet.

Figure 6:
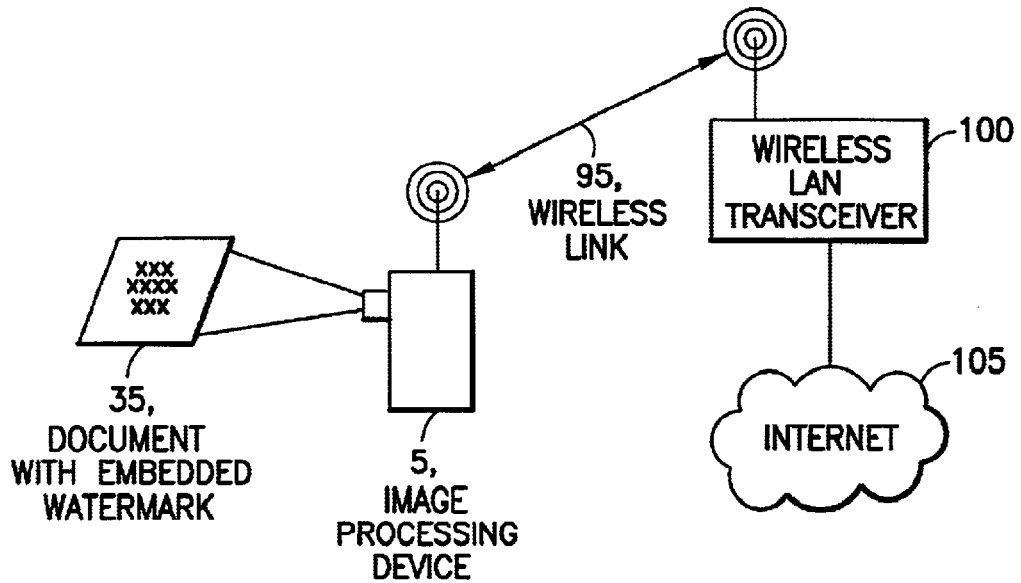
FIG. 6 is a block diagram of the hand-held digitally watermarked image reader system with a link to the Internet.

FIG. 6 shows an embodiment wherein a document with an embedded digital watermark is read by the hand-held reader 5, also referred to as an image processing device, and where the network link adapter 68 supports a wireless link 95 (e.g., an RF link such as one based on Bluetooth, or an IR link) to a wireless local area network (LAN) transceiver 100. The LAN transceiver 100 provides access to the Internet 105, enabling bidirectional communication between the user interface 62 of the reader 5 and the contacted WWW site identified by the address extracted from the digital watermark 35. In this case the decoded information from the digitally watermarked image 3 may be transmitted from the reader 5 as data packets using a TCP/IP format, or the transmitted data may be received, packetized and formatted appropriately by some other device or devices located external to the reader 5.

It can be appreciated that the techniques and devices described above are also useful for authenticating objects, such as documents, negotiable instruments, works of art and currency, based on various coding mechanisms and digital watermark(s) included on a surface or surfaces of the object. Further in accordance with an example of these teachings, an authentication code or password could be encoded into the digital watermark 35, which is read and decoded by the reader 5, and which is then transmitted via the network link interface 68 to a computer (local or remote) where the extracted authentication code or password is used to access a database wherein indicia related to the object are stored. These indicia could include, but are not limited to, a serial number, a textual description of the object, a weight of the object and/or one or more images of the object, which are then transmitted back and displayed to the operator of the reader 5, enabling the operator to make a manual verification of the genuineness or authenticity of the object being examined.

For the law enforcement example given above the extracted information could be transferred to a law enforcement computer for verification, as well as to lookup any information that may be stored regarding the identified person, and some or all of the information from the database may be transmitted back to the hand-held reader 5 in real time or substantially real time for viewing by the law enforcement personnel.

While described in the context of a portable, hand-held reader 5, it should be appreciated that certain aspects of these teachings may be practiced with reader systems that are not portable or hand-held, or that are intended to be operated in a fixed location, or that are integrated into larger systems, such as document (e.g., check or mailpiece) sorting and handling systems. In some applications the reader 5 could be installed within a vehicle or an aircraft and, while portable, is not intended to be used in a hand-held manner. In some applications the reader 5 could be installed within or with another type of hand-held device, such as a flashlight or a portable data terminal or a communication device.

It should further be appreciated that in those embodiments wherein the reader 5 is integrated with another device that certain components may be used in common between the two devices, such as the CPU 65, and/or the source 10, and/or the imager sub-system 30. Furthermore, the network link adapter 68 may also be employed for other purposes by the other device. However, and in accordance with these teachings, the network link adapter 68 is used at certain times for transmitting the information decoded from the digitally watermarked image 3, and may then also be used for receiving related information from a data processor to which the decoded information was transmitted and subsequently received, or which otherwise acted upon the decoded information.

In any of these various embodiments, the information from a digitally watermarked image, such the bar code 4, that is read and decoded by the reader 5 can be used to access remotely stored information over a data communication network, and may form all or part of a network address, or may form all or part of a key or an index to locate related information within a database. Various forms of network data encryption may also be employed, and the extracted information may relate in whole or in part to encrypting and/or decrypting related data communication network data.

The transmitted data derived from the processing of the digitally encoded watermark image 3 may be combined with other data that is automatically generated or that is manually entered into the hand-held reader 5 using the keypad 62B.

Furthermore, the digitally encoded watermark image 3 that is placed on the substrate 50 may be combined with non-digitally watermarked images, including text and other indicia.

In a still further embodiment of these teachings the hand-held reader 5 is enabled to also detect the presence or absence of a physical security feature or a taggant placed on or in the substrate 50, such as a UV fluorescent color ink, threads, fibers, planchettes and/or particles, and to use the detected presence or absence of the security features in conjunction with the digitally watermarked image 3 as information in the watermarked image and/or as a key to unlock the coded information in the digitally watermarked image. In this regard the reader 5 may determine from, by example, one or more of the size, density per unit area, shape, color and/or UV emission wavelengths a code or other information that is used in conjunction with the digitally watermarked image 3.

More particularly, this aspect of these teachings provides for the use of one or more physical characteristics or attributes of an object as at least one input for creating a digital watermark and/or as a key to access information included in a digital watermark.

The physical characteristics may be directly or indirectly observable. For example, the physical characteristics may include a visually measurable dimension of the object, or may be derived from one or more taggants. The physical characteristics derived from one or more taggants may include the specific size, shape, color, emission wavelength, loading factor (i.e., density per unit area) or other physical characteristics or attributes of one or more taggants that have been incorporated into or are otherwise associated with the object.

As an example of a particular type of taggant, fibers can be extruded to have various diameters ranging from several microns to, for example, some tens of microns. In addition, fibers may be produced having a cross section that is other than circular, for example, triangular, rectangular, ellipsoidal, etc. Fibers may also be produced having specific lengths and may also be produced to have an essentially straight or a non-straight (e.g., curved) shape.

Planchettes can be manufactured to have different, specific diameters and thicknesses, while particles can be produced, such as by precipitation, to have controlled size ranges and shapes.

In each of the foregoing examples various dyes can be used to impart a color and/or a characteristic emission wavelength when illuminated by light, such as UV light, or when otherwise irradiated.

Other taggants that may be used include radio frequency and/or magnetic materials. For example, crystals that resonate at particular frequencies may be incorporated into or made a part of the substrate 50. As another example, a layer of magnetic material may be dispersed throughout the substrate 50 that exhibits a specific, measurable, magnetic field. As a further example, a magnetic ink may be used which may exhibit a particular magnetic field.

In accordance with this aspect of these teachings, by creating specific ranges of physical dimensions a coding scheme can be created. In the case of fibers, for example, the following measurably different diameter ranges (D) may be created, 1–5 microns, 10–15 microns, 20–25 microns, and 30–35 microns. As part of the same example, different lengths (L) can be used, e.g., 1.5 mm, 3 mm, and 5 mm. Furthermore, one or more categories of shape (S) can be created, for example, straight or bent. Using these exemplary physical fiber attributes: three different lengths, four different diameters, and two different shapes, there are $L^{(D S)}$ ($3^{4*2}$) or 6561 unique combinations of physical attributes that can be used for coding and authenticating. The use of various concentrations or densities (loading factors) of the various fiber types adds even further unique combinations.

A similar coding can be accomplished using particles having controlled size distributions. Materials that maintain their dimensions, including hard polymer materials as well as phosphors, can be used to create powders having particles that are accurately sized. For example, if particles with four different mean radii are used in combination with five wavelength ranges of fluorescence, up to $4^5$, or 1024 codes can be created.

Particles are particularly well suited for coding products that retain some of the particles, such as textiles, porous materials, paper, etc. By applying various particle combinations on the object, or on or in a substrate 50 attached to the object, a post manufacturing code can be created. Although electrostatic attraction may cause these particles to be adequately retained, enhanced binding can be achieved using appropriate materials, for example, a mesh incorporated into the product or binding agents such as starches or sprays having adhesive properties.

Additional coding combinations can be made by incorporating fluorescence emission or body color into the taggant. With UV excitation, for example, five unique wavelength categories or frequency ranges can be created. Combining these five different wavelength categories and three lengths yields $L^F$, or $3^5$ combinations, or 243 codes. Even more codes are possible by combining other attributes, such as diameter and shape. For example, using four diameters and five frequency ranges yields $D^F$ ($4^5$), or 1024 codes.

In addition, the loading factors of various taggants can be employed as a further variable. For example, there may be a set of taggants having two members, the first comprised of red particles of 50 micron diameter and the second comprised of a red (or green, or blue, or yellow) particle having an 80 micron diameter. The first particles may be present with a loading factor of 20 per square centimeter, while the second particles may be present with a loading factor of 40 particles per square centimeter. By counting the numbers of particles per unit area of each type, it is possible to determine the information encoded by the selected taggants. For example, a paper document having this particular set of taggants is identified as a first type of negotiable instrument, while another paper document having a different set of taggants (e.g., red particles of 25 micron diameter and 80 micron diameter with loading factors of 50 per square centimeter and 100 per square centimeter, respectively) is identified as a second type of negotiable security. Furthermore, one may verify the authenticity of the negotiable security by verifying that the expected set of taggants are actually present with the expected size ranges and loading factors.

As mentioned above, the coding information generated from the physical characteristics of the object is then used as at least one input for creating the digitally watermarked image 3. The watermark itself may be created using any number of the methods mentioned above.

One example of such a method might include utilizing the coding information as a seed for a pseudo-random number generator, where the random number is used as a hash, or some other one-way function for generating the digitally watermarked image 3.

Another technique might include utilizing the coding information, the output of a pseudo-random number generator, and any other appropriate information as distinct inputs to an algorithm including a discrete cosine transform to form a digitally watermarked image 3. Referring again to FIG. 1, it can be appreciated that the taggant-related information can be used as the other information 1B that is input to the digital watermarking algorithm 2.

In another embodiment, one or more of the various inputs to the digital watermarking algorithm may be used as a key to obtain information included in the digital watermark.

Using the fluorescent emission example above, an unprinted document substrate 50 may include a code that is derived from five unique wavelength categories of fluorescence and three fiber lengths yielding $L^F$, or $3^5$ combinations, or 243 codes. The particular code of this substrate then becomes one of a number of data inputs into the digital watermarking algorithm 2 that digitally watermarks or digitally signs the printed information to be placed on the substrate 50.

Thus, the coding information generated from the physical characteristics of the object is used for creating a digital watermark or signature that becomes part of the printed information on the same physical substrate 50. The result is a coupling of the physical substrate characteristics and the printed information, utilizing the derived code.

The digitally watermarked image 3 may be embodied as part of the object of interest, for example, it may be printed on the object, or it may be included as part of a substrate of the object.

Furthermore, and as was noted above, the bar code 4 encrypted with digitally watermarked information can be made to contain a pass key to allow reading of the bar code itself. If the digital watermark is not read, the hand-held reader 5 will not read the bar code.

As a further embodiment, the physical characteristics of the object maybe encoded in a radio frequency identification device, or may be included as information in a semiconductor device, for example a memory device or other type of integrated circuit. The information in these devices may then be used as an input to the digital watermark algorithm 2 and/or as a key to access information included in a digital watermark 35. These devices could be incorporated on, or into, the substrate 50, or could otherwise be associated with the object and the digitally watermarked image 3.

Figure 7:
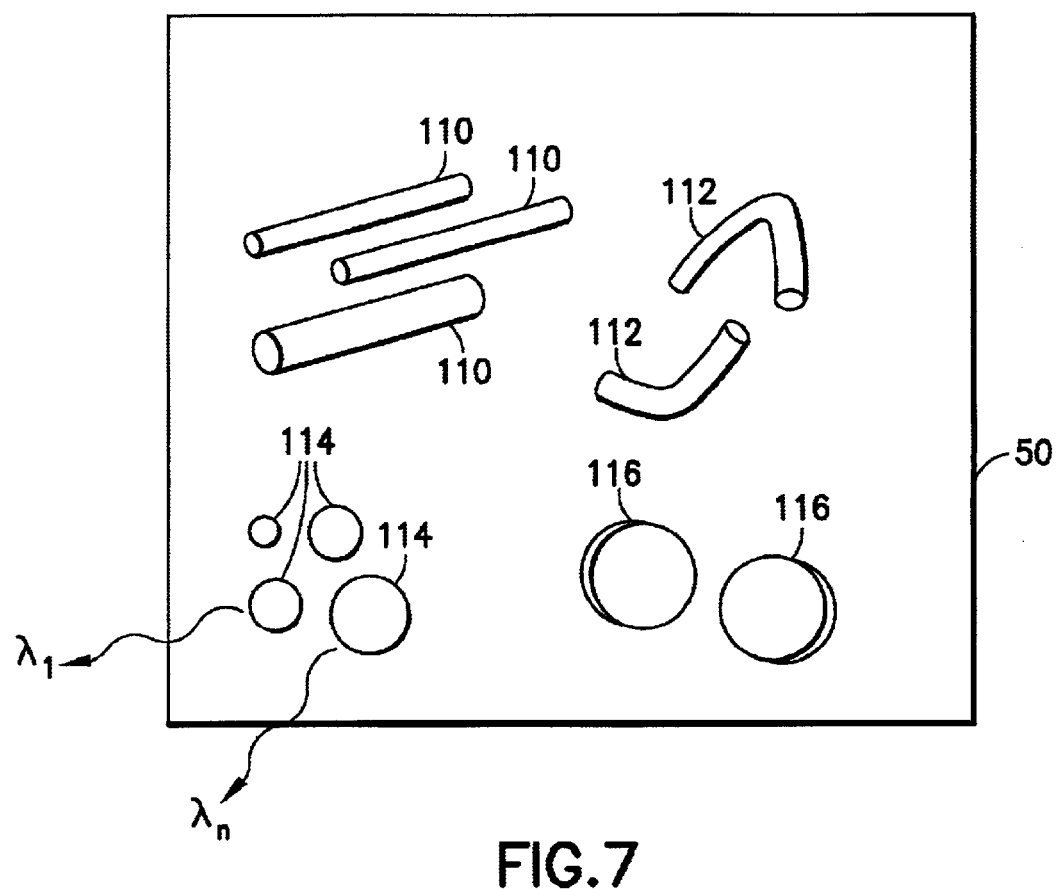
FIG. 7 illustrates an exemplary substrate having various taggants or security features.

FIG. 7 shows an example of the substrate 50 having a coding and authentication scheme wherein several fibers 110 having the same length are embedded in the substrate 50, but where the fibers have differing diameters. Thus, the substrate 50 can be coded by the numbers of each type of fiber per unit area. This information can then be utilized as at least part of the data input for a digital watermarking algorithm 2 that generates the digitally watermarked image 3 that is printed or otherwise applied to the substrate 50.

FIG. 7 also shows the use of fibers 112 that are bent in shape, as a further coding level, and also other types of objects, such as particles 114 of differing diameters and emission wavelengths, and planchettes 116 of different sizes and also possibly differing colors an/or emission wavelengths ($\lambda_i$-$\lambda_n$) It should be understood that he shapes of the particles 114 and planchettes 116 are not limited to a rectangular or spherical shape, or to any other particular shape. For example, an elliptically shaped particle could be used, as could particles having random shapes and sizes.

As an example of this aspect of these teachings, a digital passport or driver's license photograph may include taggants 112, 114 and/or 116, the substrate 50, and a photograph including a digital watermark image 3. In one embodiment the physical attributes of the taggants, represented as a code, for example R, 50, S (red emission, 50 micron fiber, straight) are used as one of the inputs (the other information 1B input) for creating the digitally watermarked image 3. In another embodiment, the physical attributes of the taggants represented by the code R, 50, S are detected by the reader 5 and used as a key, or as part of an input into a key generating algorithm, where the key is used to unlock, decrypt, or otherwise retrieve information encoded in the digitally watermarked image 3.

The decoding or identification of a code employs imaging of the taggants and/or the detection of fluorescent emission or color if present. This can be achieved using a proper selection of filter(s) 90 to form a narrow band filtered detection system including the CCD camera imager 80.

It may be appreciated that these teachings are particularly well-suited for implementing various e-commerce and on-line commerce and trading applications wherein, by example, identifying indicia related to a subscriber or a customer can be obtained from a card carried by the subscriber or customer and transmitted to a remote server for directing further activity by the server, such as logging-in the subscriber or customer, accessing a subscriber or customer online profile and/or preferences file, as well as other activities. In this case the reader 5 may be embodied in a PC or other type of computing or communication device operated by the customer or subscriber.

Thus, it should be appreciated that while these teachings have been particularly shown and described with respect to preferred embodiments thereof, it will be understood by those skilled in the art that changes in form and details may be made therein without departing from the scope and spirit of the invention.

What is claimed is:

1. A hand-held system for use with an object bearing a digitally watermarked image, comprising:
   an image forming subsystem for generating digital data representing the digitally watermarked image;
   a data processor for processing the digital data for extracting information encoded within the digitally watermarked image;
   an adapter for coupling the extracted information through a communication link to an external data processor; and
   said digitally watermarked image is applied to a substrate containing at least one taggant, said at least one taggant providing additional information utilized in conjunction with the information encoded within the digitally watermarked image, and wherein said additional information provided by the at least one taggant is utilized by said hand-held system for at least one of extracting or supplementing the information encoded within the digitally watermarked image.

2. A hand-held system as in claim 1, wherein the communication link is comprised of a wireless link.

3. A hand-held system as in claim 1, wherein the communication link is comprised of a wired link.

4. A hand-held system as in claim 1, wherein the external data processor receives the extracted information through a data communications network.

5. A hand-held system as in claim 1, wherein the external data processor receives the extracted information through the Internet.

6. A hand-held system as in claim 1, wherein the communication link is comprised of a wireless link to an interface to the Internet.

7. A hand-held system as in claim 1, wherein the data processor processes the digital data to compensate for distortions in the digitally watermarked image caused by the orientation of the hand-held device with respect to the digitally watermarked image.

8. A method for use with an object bearing a digitally watermarked image, comprising:
   generating digital data representing the digitally watermarked image;
   processing the digital data for extracting information encoded within the digitally watermarked image;
   coupling the extracted information through a communication link to a data processor, receiving the extracted information at the data processor and operating the data processor to take some action based on the received information; and
   wherein the digitally watermarked image is applied to a substrate containing at least one taggant for specifying additional information, and where the step of processing uses the additional information in conjunction with the information encoded within the digitally watermarked image, and wherein said additional information provided by the at least one taggant is utilized by said hand-held system for at least one of extracting or supplementing the information encoded within the digitally watermarked image.

9. A method as in claim 8, wherein the communication link is comprised of one of a wireless link or a wired link.

10. A method as in claim 8, wherein the data processor receives the extracted information through a data communications network.

11. A method as in claim 8, wherein the data processor receives the extracted information through the Internet.

12. A method as in claim 8, wherein the step of coupling uses one of a wired link or a wireless link to interface to the Internet.

13. A method as in claim 8, wherein the data processor processes the digital data to compensate for distortions in the digitally watermarked image caused by an orientation of a hand-held imaging device with respect to the digitally watermarked image.

14. A method as in claim 8, wherein the extracted information is comprised of a data communications network address through which the data processor can be reached.

15. A method as in claim 8, wherein the action is comprised of using the extracted information to access a database.

16. A method as in claim 8, wherein the steps of generating and processing occur within a hand-held device.

17. A method for use with an object bearing a digitally watermarked image, comprising:
   operating a hand-held device to generate digital data representing the digitally watermarked image and to process the digital data to extract information encoded within the digitally watermarked image;
   transmitting the extracted information through at least one of a wired or a wireless communication link towards a data processor located external to the hand-held device;
   receiving the extracted information at the data processor;
   operating the data processor to take some action based on the received information; and
   wherein the digitally watermarked image is applied to a substrate containing at least one taggant for expressing additional information, and where the step of operating the hand-held reader uses the additional information in conjunction with the information encoded within the digitally watermarked image, and wherein the hand-held reader uses the additional information of the at least one taggant in the operating step to at least one of extract or supplement the information encoded within the digitally watermarked image.

18. A method as in claim 17, wherein the data processor receives the extracted information through a data communications network.

19. A method as in claim 17, wherein the data processor receives the extracted information through the Internet.

20. A method as in claim 17, wherein the extracted information is comprised of a data communications network address through which the data processor can be reached.

21. A method as in claim 17, wherein the action is comprised of using the extracted information to access a database.

22. A method as in claim 17, wherein the action is comprised of using the extracted information to verify an identity of the object.

23. A method as in claim 17, wherein the action is comprised of using the extracted information to verify an identity of a person who is associated with the object.

24. A method as in claim 17, wherein the action is comprised of using the extracted information to obtain information that is associated with a person who is associated with the object.

25. A method as in claim 17, wherein the action is comprised of using the extracted information to verify an authenticity of the object.

26. A method as in claim 17, wherein the action comprises transmitting information from the data processor for reception by the hand-held device.

27. A method as in claim 17, wherein the action comprises transmitting information from the data processor for display by the hand-held device.

* * * * *